United States Patent
Sagou et al.

(10) Patent No.: US 10,583,713 B2
(45) Date of Patent: Mar. 10, 2020

(54) HEATING SYSTEM FOR VEHICLE SWITCHABLE BETWEEN NON-CONTACT AND CONTACT HEATING PRIORITY MODES

(71) Applicant: DENSO CORPORATION, Kariya, Aichi-pref. (JP)

(72) Inventors: Yasuhiro Sagou, Kariya (JP); Hideaki Kako, Kariya (JP); Kimitake Ishikawa, Kariya (JP); Hiroyasu Oide, Kariya (JP); Hideki Seki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 15 days.

(21) Appl. No.: 15/309,214

(22) PCT Filed: May 26, 2015

(86) PCT No.: PCT/JP2015/002656
§ 371 (c)(1),
(2) Date: Nov. 7, 2016

(87) PCT Pub. No.: WO2015/182126
PCT Pub. Date: Dec. 3, 2015

(65) Prior Publication Data
US 2017/0080779 A1   Mar. 23, 2017

(30) Foreign Application Priority Data
May 27, 2014   (JP) .................. 2014-109383

(51) Int. Cl.
*B60H 1/22*   (2006.01)
*B60H 1/00*   (2006.01)

(52) U.S. Cl.
CPC ....... *B60H 1/2218* (2013.01); *B60H 1/00285* (2013.01); *B60H 1/00292* (2013.01);
(Continued)

(58) Field of Classification Search
CPC ................. B60H 1/2218; B60H 2001/224
(Continued)

(56) References Cited

U.S. PATENT DOCUMENTS 4,687,948 A * 8/1987 Helt ................. H02J 3/14
307/38
6,397,615 B1 * 6/2002 Kawai ............ B60H 1/00735
236/91 C
(Continued)

FOREIGN PATENT DOCUMENTS

FR       2917855 A1 * 12/2008 ......... B60H 1/00742
JP    H02262419 A    10/1990
(Continued)

OTHER PUBLICATIONS

Kamiya, et al, JP2002-172926A English machine translation, dated Jun. 18, 2002.*

(Continued)

*Primary Examiner* — Edelmira Bosques
*Assistant Examiner* — Phillip Decker
(74) *Attorney, Agent, or Firm* — Harness, Dickey & Pierce, P.L.C.

(57) ABSTRACT

A heating system for a vehicle includes: a heater for non-contact heating that emits radiation heat by heat supplied from its heat generating part, which generates heat upon energization, to give warmth to an occupant in a state where a body of the occupant is not in contact with the heater; a heater for contact heating that generates heat upon energization to give warmth to the occupant in a state where the body of the occupant is in contact with the heater; and a control device that controls operations of the heater for contact heating and the heater for non-contact heating. The control device adjusts a heating output provided by the heater for contact heating and a heating output provided by
(Continued)

the heater for non-contact heating, and controls the operations. Therefore, the occupant can enjoy a sense of heating that is not stereotypical, and achieve energy saving.

9 Claims, 5 Drawing Sheets

(52) U.S. Cl.
CPC .................. *B60H 2001/224* (2013.01); *B60H 2001/2243* (2013.01); *B60H 2001/2265* (2013.01); *B60H 2001/2293* (2013.01)

(58) Field of Classification Search
USPC ...................................... 237/2 R, 12, 2 A, 28
See application file for complete search history.

(56) References Cited

U.S. PATENT DOCUMENTS

| | | | | |
|---|---|---|---|---|
| 6,550,686 | B2* | 4/2003 | Kawai | B60H 1/00792 |
| | | | | 236/49.3 |
| 6,575,233 | B1* | 6/2003 | Krumnow | G05D 27/02 |
| | | | | 165/208 |
| 7,578,341 | B2* | 8/2009 | Ichishi | B60H 1/00742 |
| | | | | 165/202 |
| 8,884,191 | B2* | 11/2014 | Ogino | B60H 1/00271 |
| | | | | 219/202 |
| 9,854,995 | B2* | 1/2018 | Demirdjian | A61B 5/103 |
| 9,873,309 | B2* | 1/2018 | Sagou | B60H 1/2218 |
| 2002/0110178 | A1* | 8/2002 | Puranen | G01J 5/02 |
| | | | | 374/121 |
| 2008/0296939 | A1* | 12/2008 | Bajic | B60H 1/00285 |
| | | | | 297/180.1 |
| 2009/0031741 | A1* | 2/2009 | Hara | B60H 1/00735 |
| | | | | 62/239 |
| 2009/0179080 | A1* | 7/2009 | Alston | B60H 1/00378 |
| | | | | 237/28 |
| 2010/0130808 | A1* | 5/2010 | Hattori | B60H 1/00742 |
| | | | | 600/9 |
| 2010/0176110 | A1 | 7/2010 | Ogino et al. | |
| 2010/0258645 | A1* | 10/2010 | Hioki | B60H 1/2218 |
| | | | | 237/28 |
| 2012/0234932 | A1* | 9/2012 | Okamoto | F24H 3/002 |
| | | | | 237/2 R |
| 2013/0059522 | A1* | 3/2013 | Ota | B60H 1/00842 |
| | | | | 454/159 |
| 2013/0068440 | A1* | 3/2013 | Kamiyama | B60H 1/00849 |
| | | | | 165/202 |
| 2013/0144470 | A1* | 6/2013 | Ricci | H04W 4/90 |
| | | | | 701/2 |
| 2015/0028116 | A1* | 1/2015 | Satzger | B60H 1/2218 |
| | | | | 237/5 |
| 2016/0046174 | A1 | 2/2016 | Sagou et al. | |

FOREIGN PATENT DOCUMENTS

| | | | |
|---|---|---|---|
| JP | 2002172926 A | * | 6/2002 |
| JP | 2009280172 A | | 12/2009 |
| JP | 2012192829 A | | 10/2012 |
| JP | 2013060200 A | | 4/2013 |
| WO | WO-2008155893 A1 | | 12/2008 |
| WO | WO-2014155940 A1 | | 10/2014 |

OTHER PUBLICATIONS

Dutre et al., FR 2917855 A1 English machine translation, dated Dec. 26, 2008 (Year: 2008).*

* cited by examiner

HEATING SYSTEM FOR VEHICLE SWITCHABLE BETWEEN NON-CONTACT AND CONTACT HEATING PRIORITY MODES

CROSS REFERENCE TO RELATED APPLICATIONS

This application is a U.S. National Phase Application under 35 U.S.C. 371 of International Application No. PCT/JP2015/002656 filed on May 26, 2015 and published in Japanese as WO 2015/182126 A1 on Dec. 3, 2015. This application is based on and claims the benefit of priority from Japanese Patent Application No. 2014-109383 filed on May 27, 2014. The entire disclosures of all of the above applications are incorporated herein by reference.

TECHNICAL FIELD

The present disclosure relates to a heating system for a vehicle including a radiation heater that warms an occupant by radiation, and a contact heating apparatus that gives a sense of warmth to the occupant in contact therewith.

BACKGROUND ART

Patent Document 1 discloses the art for controlling the operations of a radiation heating system that is disposed at an interior member in a vehicle interior, and a contact-heating heater which is a heater for a seat, to efficiently warm an occupant. The heating system for a vehicle in Patent Document 1 performs control to warm the vehicle interior mainly by the heater for a seat at the initial stage after an occupant gets in the vehicle and to increase the output of a radiation heater after a predetermined time elapses. Thus, the trunk of the occupant's body is warmed quickly by generating heat quickly from the heater for a seat at the start of heating, and a sense of warmth around the occupant's feet is promoted by increasing the radiation toward the feet by the radiation heater after the predetermined time elapses.

PRIOR ART DOCUMENT

Patent Document

Patent Document 1: JP2013-60200A

At the start of heating, the system in Patent Document 1 necessarily sets the heating output by the radiation heater to be small, and there is thus the issue that the occupant can only gain a stereotypical sense of heating. The system cannot meet the occupant's need, for example, when the occupant wants to feel a sense of warmth around his/her feet from the radiation heater. The energy that can be used for heating has limitations in the vehicle, and thus efficient energy use is desired. Therefore, further improvements are required for the heating system for a vehicle.

SUMMARY OF INVENTION

The present disclosure addresses the above issues. Thus, it is an objective of the present disclosure to provide a heating system for a vehicle whereby an occupant can enjoy a sense of heating that is not stereotypical and which can achieve energy saving.

To achieve the objective, the present disclosure employs the following technical means. A heating system for a vehicle in an aspect of the present disclosure is disposed in the vehicle to give warmth to an occupant, and includes: a heater for non-contact heating that emits radiation heat by heat supplied from its heat generating part, which generates heat upon energization, to give warmth to the occupant in a state where a body of the occupant is not in contact with the heater for non-contact heating; a heater for contact heating that generates heat upon energization to give warmth to the occupant in a state where the body of the occupant is in contact with the heater for contact heating; and a control device that controls operations of the heater for contact heating and the heater for non-contact heating. The control device adjusts a heating output provided by the heater for contact heating and a heating output provided by the heater for non-contact heating, and controls the operations to be switchable between: a non-contact heating priority mode to make larger the heating output of the heater for non-contact heating; and a contact heating priority mode to make larger the heating output of the heater for contact heating.

Consequently, the control can be performed to be switchable between the mode for the occupant to receive the heating preferentially from the heater for non-contact heating and the mode for the occupant to receive the heating preferentially from the heater for contact heating. Thus, the heating system for the vehicle can operate one of the non-contact heating priority mode and the contact heating priority mode, and is thus not limited to the heating operation in only one mode. In the case of operation in one mode, the output from the heater corresponding to the other mode is restricted, and the energy for heating can thus be limited.

Thus, in the case of operation in the non-contact heating priority mode, the body region of the occupant to which the warmth due to the radiation heat from the heater for non-contact heating is given can be warmed more greatly. In the case of operation in the contact heating priority mode, the body region of the occupant to which the warmth from the heater for contact heating is given can be warmed more greatly. Therefore, the present disclosure can provide the heating system for the vehicle whereby the occupant can enjoy a sense of heating that is not stereotypical and which can achieve energy saving.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
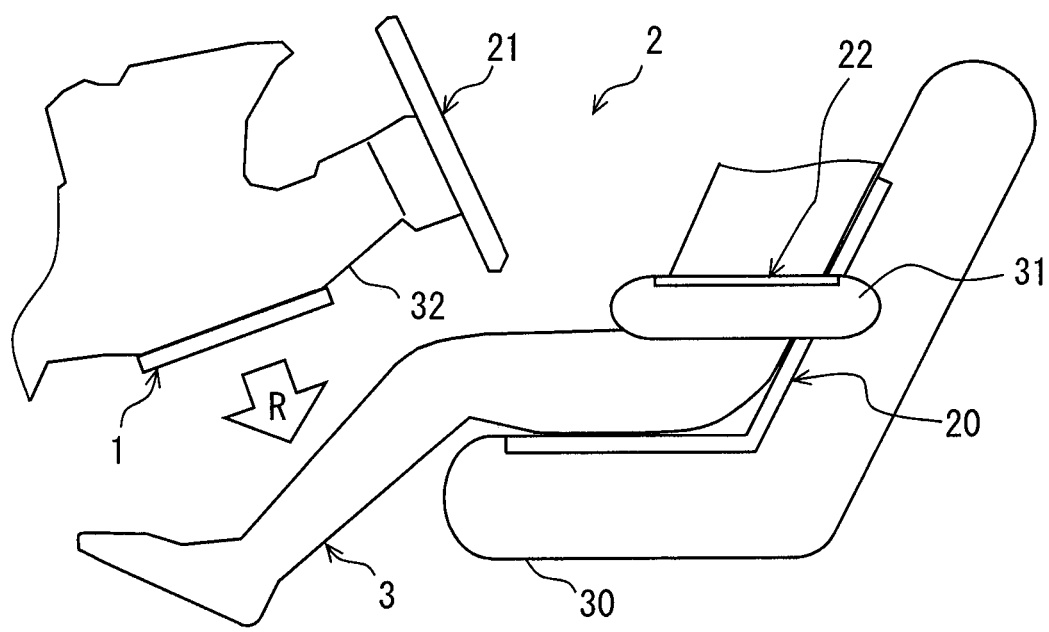
FIG. 1 is a diagram illustrating a positional relationship between a heating system for a vehicle and an occupant in accordance with each embodiment.
Figure 2:
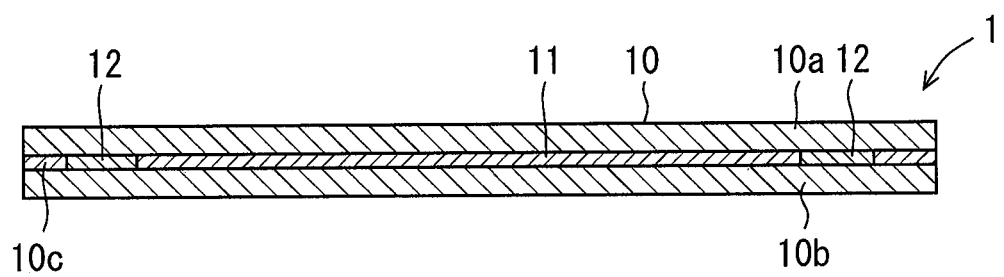
FIG. 2 is a sectional view illustrating a radiation heater in accordance with each embodiment.
Figure 3:
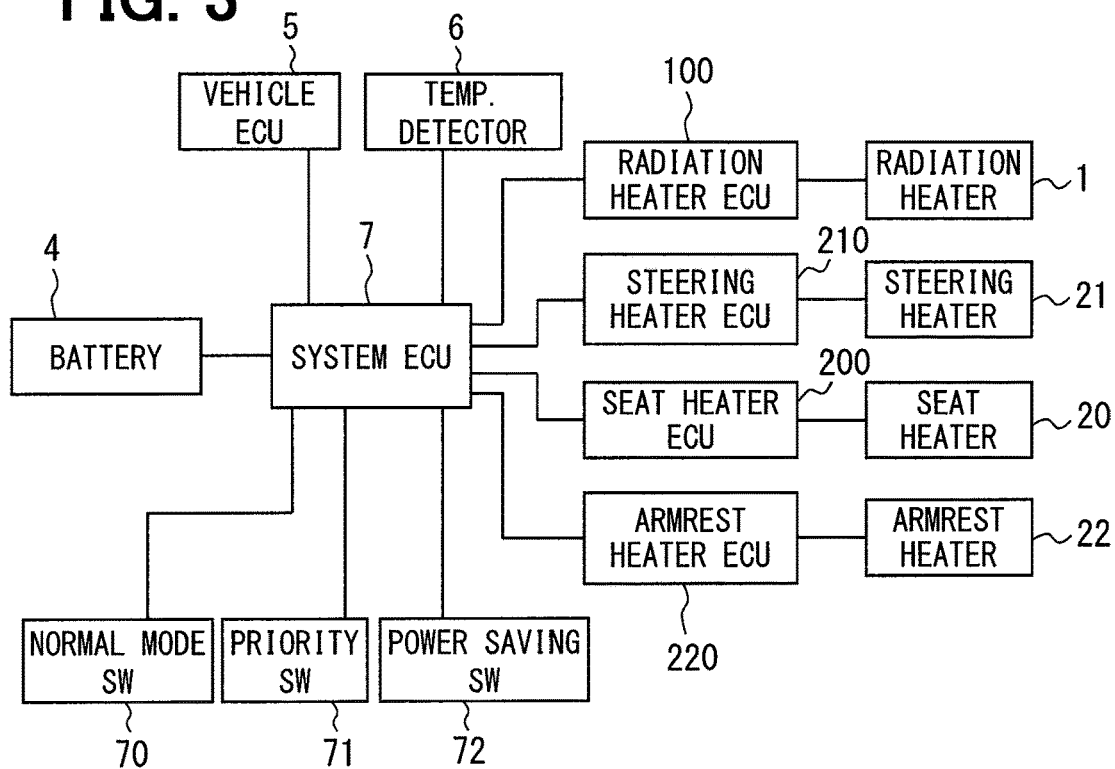
FIG. 3 is a block diagram relating to control of the heating system for a vehicle of each embodiment.

Embodiments will be described below with reference to the accompanying drawings. In each embodiment, to a part corresponding to the part described in the preceding embodiment, the same reference numeral may be given so as to omit a repeated description. In a case of description of only a part of configuration in each embodiment, a configuration in another embodiment explained ahead of the embodiment can be applied to the other part of the configuration. In the embodiments, in addition to combination between parts which are specifically shown to be combinable, embodiments can be combined partially with each other even if not expressly shown as long as the combination does not particularly create problems.

First Embodiment

A heating system 2 for a vehicle applicable to the present disclosure can be disposed, for example, in the room interior of a movable object such as a road-traveling vehicle, a vehicle for construction work, or a railroad vehicle. A first embodiment describes the heating system 2 for the vehicle disposed in an automobile with reference to FIGS. 1 to 4.

In FIG. 1, the heating system 2 for the vehicle is configured as a part of the heating system for an occupant 3 in a vehicle interior. The heating system 2 for the vehicle is configured to include at least a heater for non-contact heating and a heater for contact heating that give warmth to the occupant 3. The heater for non-contact heating is a heating apparatus that emits radiation heat by the heat supplied by a heat generating part 11 for generating heat upon energization, to give warmth to the occupant 3 with the body of the occupant 3 not in contact with the apparatus. The heater for contact heating is a heating apparatus that produces heat upon energization to give warmth to the occupant 3 with the body of the occupant 3 in contact with the apparatus.

Each of the heater for non-contact heating, the heater for contact heating is a electrically-driven heater apparatus that is fed with power by a power source such as a battery or a generator disposed in the movable object, to generate heat. The heater for non-contact heating is, for example, a radiation heater 1 illustrated in FIG. 1. The heater for contact heating is, for example, a seat heater 20, a steering heater 21, or an armrest heater 22 illustrated in FIG. 1.

The seat heater 20 is an electric heater that is disposed integrally with the seat part of a seat 30 on which the occupant 3 is seated, and with the backrest part of the seat 30 on which the back of the occupant 3 is reclined, to be capable of warming the part of the body of the occupant 3 that is in contact with the seat heater 20. The seat heater 20 is, for example, an electric-resistance type heater unit that is provided between a seat trim assembly and a cushion pad of each of both the seat part and the backrest part.

The steering heater 21 is an electric heater that is wound around or embedded in the steering part of a steering or the like to be disposed integrally with the steering part, and can warm the hands of the occupant 3 holding the steering part. The steering heater 21 is also referred to as a steering wheel heater. The steering heater 21 is, for example, an electric-resistance type heater unit that is provided between an a surface member and a frame part at the part of the steering wheel held by the occupant 3.

The armrest heater 22 is, for example, an electric heater that is disposed integrally with an armrest part 31 (also referred to as an armrest) which is provided aside of the occupant 3 seated on the seat 30 to be capable of warming the part of the hand of the occupant 3 that is in contact with the armrest heater 22 when the occupant 3 places the hand on the armrest part 31. The armrest heater 22 is, for example, an electric-resistance type heater unit that is provided between the surface member and the cushion pad of the armrest part 31. The armrest heater 22 may be configured to be disposed integrally with, for example, the inside of a door or a center console.

Each of the radiation heater 1, the seat heater 20, the steering heater 21, and the armrest heater 22 is configured to operate with the power fed by a battery 4 as operating power. The seat heater 20, the steering heater 21, and the armrest heater 22 are controlled such that their surface temperatures do not exceed an upper limit temperature.

The output, the temperature, and the generated heat amount of the seat heater 20 are controlled by a seat heater ECU 200. The seat heater ECU 200 can control the heating output, the temperature, the generated heat amount and so forth of the seat heater 20, for example, by controlling the voltage value and the current value applied to the heat generating part of the seat heater 20. Thus, the seat heater ECU 200 can vary a heating capacity provided for the occupant 3.

When the energization of the seat heater 20 is started by the seat heater ECU 200, the temperature of the seat heater 20 rises to a temperature that matches with the controlled heating capacity. The seat heater 20 can perform contact heating that provides warmth quickly for the part of the body of the occupant 3 that is in contact with the seat heater 20, for example, during the winter season.

The output, the temperature, and the generated heat amount of the steering heater 21 are controlled by a steering heater ECU 210. The steering heater ECU 210 can control the heating output, the temperature, the generated heat amount and so forth of the steering heater 21, for example, by controlling the voltage value and the current value applied to the heat generating part of the steering heater 21. Thus, the steering heater ECU 210 can vary a heating capacity provided for the occupant 3.

When the energization of the steering heater 21 is started by the steering heater ECU 210, the temperature of the steering heater 21 rises to a temperature that matches with the controlled heating capacity. The steering heater 21 can perform contact heating that provides warmth quickly for the part of the body of the occupant 3 that is in contact with the steering heater 21, for example, during the winter season.

The output, the temperature, and the generated heat amount of the armrest heater 22 are controlled by an armrest heater ECU 220. The armrest heater ECU 220 can control the heating output, the temperature, the generated heat amount and so forth of the armrest heater 22, for example, by controlling the voltage value and the current value applied to the heat generating part of the armrest heater 22. Thus, the armrest heater ECU 220 can vary a heating capacity provided for the occupant 3.

In the case of the heater for contact heating, the heating output can be obtained by calculating the amount of heat received by the occupant 3 using the surface temperature of the heater. In the case of the heater for non-contact heating, the heating output can be obtained by calculating the amount of heat received by the occupant 3 using the surface temperature of the heater. In the case of the heater for non-contact heating, the heating output can be obtained by calculating the amount of heat received by the occupant 3 using the conductive heat ($W/m^2$) measured by a heat flow sensor, i.e., a density of heat flux transmitted inside the sensor in a direction perpendicular to the surface.

When the energization of the armrest heater 22 is started by the armrest heater ECU 220, the temperature of the armrest heater 22 rises to a temperature that matches with the controlled heating capacity. The armrest heater 22 can perform contact heating that provides warmth quickly for the part of the body of the occupant 3 that is in contact with the armrest heater 22, for example, during the winter season.

The radiation heater 1 has a thin plate-like shape. When fed with power, the radiation heater 1 generates heat. The radiation heater 1 radiates radiation heat R mainly in a direction perpendicular to its surface to warm the object located in the direction perpendicular to the surface.

The radiation heater 1 is disposed in the vehicle interior to radiate the radiation heat R to the feet of the occupant 3. The radiation heater 1 is disposed on the wall surface of the vehicle interior. The wall surface of the vehicle interior includes an interior part such as an instrument panel, a door trim, or a ceiling. The radiation heater 1 is disposed to be opposed to the occupant 3 in an assumed normal posture. For example, a road-traveling vehicle includes a steering column 32 for supporting a steering wheel. The radiation heater 1 can be disposed on the lower surface of the steering column 32 to be opposed to the occupant 3.

The radiation heater 1 is formed in the shape of a generally quadrangular thin plate. The radiation heater 1 includes a substrate part 10 that constitutes a heater main body, the heat generating parts 11, and a pair of terminal parts 12 which are conductive parts. The radiation heater 1 can also be referred to as a surface-shaped heater that radiates the radiation heat R mainly in a direction perpendicular to its surface.

The substrate part 10 is made from a resin material that has excellent electrical insulation properties and that resists high temperatures. The substrate part 10 is a multilayer substrate. The substrate part 10 includes a front surface layer 10a, a rear surface layer 10b, and a rear surface layer 10c. The front surface layer 10a faces toward the radiation direction of the radiation heat R. In other words, the front surface layer 10a is a surface that is disposed to be opposed to a part of the occupant 3 which is a heating object in an installation state of the radiation heater 1. The rear surface layer 10b is a back side of the radiation heater 1. The rear surface layer 10c supports the heat generating part 11 and the terminal part 12. The substrate part 10 is a member for supporting the heat generating parts 11 each of which has a linear shape. The front surface layer 10a, the rear surface layer 10b, and the rear surface layer 10c are insulation parts made from a material having a lower heat conductivity than the heat generating part 11 and the terminal part 12. For example, the front surface layer 10a, the rear surface layer 10b, and the rear surface layer 10c are made from polyimide resin.

Each of the heat generating parts 11 is made from a material that produces heat upon energization. The heat generating part 11 can be made from a metallic material. For example, the heat generating part 11 can be configured from copper, silver, tin, stainless steel, nickel, nichrome or the like. Each of the heat generating parts 11 has a linear shape or a plate shape parallel to the surface of the substrate part 10, and is disposed dispersedly with respect to the surface of the substrate part 10.

Each heat generating part 11 is connected to the pair of terminal parts 12 that are arranged with a predetermined distance therebetween. The heat generating parts 11 are arranged at intervals between the pair of terminal parts 12. The heat generating parts 11 are connected to the pair of terminal parts 12 in parallel to bridge the gap between the pair of terminal parts 12, and are provided generally all over the surface of the substrate part 10. Together with the rear surface layer 10c, the heat generating parts 11 are provided to be located between the front surface layer 10a and the rear surface layer 10b. The heat generating parts 11 are protected from the outside by the substrate part 10.

Each heat generating part 11 is a member that is thermally connected at least to the front surface layer 10a and that produces heat upon energization. The heat generated by the heat generating part 11 is accordingly transmitted to the front surface layer 10a. The heat generated by the heat generating part 11 is radiated as the radiation heat from the front surface layer 10a to the outside via the member such as the substrate part 10 to be provided for the occupant 3 who is opposed to the radiation heater 1.

To achieve a predetermined generated heat amount, the heat generating part 11 is set to have a predetermined length. Thus, each heat generating part 11 is set to have a predetermined resistance value. The size and shape of each heat generating part 11 are set such that its thermal resistance in the traverse direction has a predetermined value. Consequently, when a predetermined voltage is applied to the heat generating parts 11, the heat generating parts 11 generate the predetermined amount of heat. The heat generating parts 11 generate the predetermined amount of heat and their temperature rises to a predetermined temperature. The heat generating parts 11 whose temperature has increased to the predetermined temperature heat the front surface layer 10a so that the front surface layer 10a has a predetermined radiation temperature. The radiation heater 1 can radiate the radiation heat R, which makes the occupant 3 feel the warmth, from the front surface layer 10a.

The output, the temperature, and the generated heat amount of the heat generating part 11 are controlled by a radiation heater ECU 100. The radiation heater ECU 100 can control the heating output, the temperature, the generated heat amount and so forth of the heat generating part 11, for example, by controlling the voltage value and the current value applied to the heat generating part 11. Thus, the radiation heater ECU 100 can vary a radiant heat amount and a heating capacity provided for the occupant 3.

When the energization of the radiation heater 1 is started by the radiation heater ECU 100, the surface temperature of the radiation heater 1 rises to a radiation temperature that matches with the controlled heating capacity. Thus, warmth can be provided quickly for the occupant 3, for example, during the winter season.

When an object comes into contact with the front surface layer 10a of the radiation heater 1, the heat transmitted to the front surface layer 10a from the heat generating part 11 is transmitted quickly to the object in contact with the front surface layer 10a. Consequently, the temperature of the part of the front surface layer 10a that is in contact with the object reduces quickly. Thus, the surface temperature of the part of the radiation heater 1 that is in contact with the object reduces quickly. The heat of the part of the radiation heater 1 that is in contact with the object is transmitted to the object in contact, and diffuses to the object in contact. Thus, an excess rise in surface temperature of the object in contact with the radiation heater 1 is limited.

The battery 4 may be configured by, for example, a battery group including an aggregation of unit batteries. Each unit battery can be configured by, for example, a nickel hydrogen secondary battery, a lithium-ion secondary battery, or an organic radical cell. For example, the battery 4 can be charged with and discharge electricity, and can be used for supplying electric power to a motor for vehicle traveling.

A system ECU 7 is supplied with a direct current power source from the battery 4 which is an in-vehicle power source to perform operation processing and control processing, irrespective of whether the ignition switch or the start switch that is responsible for the starting and stop of the engine of the vehicle or the motor for vehicle traveling is turned on or off. The system ECU 7 is a control device that controls the radiation heater ECU 100, the seat heater ECU 200, the steering heater ECU 210, and the armrest heater ECU 220. The system ECU 7 transmits a control signal based on the operation processing and the control processing to each ECU to control the operation of a corresponding heater through the heater ECU.

The system ECU 7 includes a microcomputer that is configured to have the functions of a central processing unit (CPU) that performs the operation processing and the control processing, a memory such as a ROM or RAM, and an I/O port (input/output circuit), for example. The system ECU 7 includes a storage means such as a ROM or RAM. The program relating to the predetermined heating control (control processing illustrated in the flow charts) described later, and the control content that each heater ECU is previously commanded to perform are stored in the storage means.

Each heater ECU includes a microcomputer that is configured to have the functions of a central processing unit (CPU) that performs the operation processing and the control processing, a memory such as a ROM or RAM, and an I/O port (input/output circuit), for example. Each heater ECU includes a storage means such as a ROM or RAM. The storage means prestores predetermined control characteristic data. For example, the control characteristic data is used for determining the voltage value and the current value applied to the heater to produce the heating output commanded by the system ECU 7.

The system ECU 7 is configured such that various switch signals are inputted into the system ECU 7 through the operation of various operation parts on an operation panel provided integrally with, for example, the instrument panel. The operation parts include an operation switch, a normal mode switch 70, a priority switch 71, and a power saving switch 72.

The operation switch is an operation part for performing the operation start and the operation stop of each heater included in the heating system 2 for the vehicle. The operation switch may be a switch allocated to each heater, or a switch allocated to each group into which a predetermined heater is classified. When the occupant 3 operates the operation switch before operation, the heater corresponding to this switch operation can shift to its operational state via the system ECU 7. When the occupant 3 operates the operation switch during heater operation, the heater in operation can forcibly be stopped through the system ECU 7.

The normal mode switch 70 is an operation part for performing the heating operation in a normal mode that is preset in the heating system 2 for the vehicle. When the occupant 3 operates the normal mode switch 70, the heating operation in a normal mode is performed via the system ECU 7. The normal mode is an operation mode that is preset in the system ECU 7, and is, for example, a mode to operate both the heater for non-contact heating and the heater for contact heating with the same level of heating output. For example, the normal mode is a mode that is preset to operate all of the radiation heater 1, the seat heater 20, the steering heater 21, and the armrest heater 22 with the same level of heating output.

The priority switch 71 is a priority mode operation part for performing the heating operation in a priority mode that is preset in the heating system 2 for the vehicle. The priority mode is a mode in which one of a non-contact heating priority mode and a contact heating priority mode can be chosen. Thus, the priority switch 71 is an operation part that can choose a mode prioritized between the non-contact heating priority mode and the contact heating priority mode through the operation by the occupant 3. The non-contact heating priority mode is a mode in which the heating output of the heater for non-contact heating is controlled to be larger than the heating output of the heater for contact heating. The contact heating priority mode is a mode in which the heating output of the heater for contact heating is controlled to be larger than the heating output of the heater for non-contact heating.

When the occupant 3 operates the priority switch 71, a control signal relating to the chosen priority mode is inputted into the system ECU 7 from the priority switch 71. If the non-contact heating priority mode is chosen, the system ECU 7 transmits the control signal to each heater ECU to make larger the heating output of the radiation heater 1, and each heater ECU controls the operation of a corresponding heater in accordance with this command. If the contact heating priority mode is chosen, the system ECU 7 transmits the control signal to each heater ECU to make smaller the heating output of the radiation heater 1, and each heater ECU controls the operation of a corresponding heater in accordance with this command.

Thus, in accordance with the signal inputted from the priority switch 71, the system ECU 7 adjusts the heating output of the heater for contact heating and the heating output of the heater for non-contact heating to control them to be switchable between the non-contact heating priority mode and the contact heating priority mode. The radiation heater 1 may be controlled not to operate in the contact heating priority mode, and the control may be performed to operate only the radiation heater 1 and not to operate the heater for contact heating in the non-contact heating priority mode.

In the non-contact heating priority mode, the heating output of the radiation heater 1 may be set to be larger than any other heating output of the heater for contact heating. Thus, the order of the heating outputs of the other heaters for contact heating may be set in any manner.

In the contact heating priority mode, the heating output of the seat heater 20 may be set to be larger than the heating output of any other heater for contact heating among the seat heater 20, the steering heater 21, and the armrest heater 22. By setting the amount of heat received from the seat heater 20 to be the largest as above, the large amount of received heat is obtained from the largest surface area of the body of the occupant 3. Thus, the contact heating priority mode in which the occupant 3 easily feels the heating and easily gains a sense of satisfaction can be provided. In the contact heating priority mode, the heating output of the radiation heater 1 may be set to be lower than any heater for contact heating. The power saving switch 72 is a switch that can select a power saving mode to limit the use of the electric power of the vehicle for the operation of the heating system 2 for the vehicle. Specifically, the power saving switch 72 is an operation part that can be operated to select energy saving when the occupant 3 wants to restrain the electric power used for the operation of the heating system 2 for the vehicle. In the case of the power saving mode, each heater is controlled to have a preset heating output. The heating output in the power saving mode is set for each heater, and is set at a value lower than the heating output in the normal mode and in the priority mode.

When the occupant 3 operates the power saving switch 72, the system ECU 7 inputs a control signal into each heater ECU to perform control to have the heating output that is preset for a corresponding heater. Each heater ECU controls the operation of a corresponding heater in accordance with this command. Thus, the system ECU 7 receives a command signal from the power saving switch 72, and when the normal mode is set or when the priority mode is set, performs the heating operation with the output that is smaller than the heating output in each mode.

In the power saving mode, the setting may be at the heating output that is lower than the heating output in a state immediately before entering into the priority mode. In the power saving mode, the setting may be at the heating output that is lower than the heating output set in the system ECU 7 as the heating output, which is necessary to give a satisfactory sense of heating to the occupant 3.

The system ECU 7 is configured to be able to communicate with a vehicle ECU 5. The system ECU 7 is configured such that the signal of a detection result is inputted into the system ECU 7 by a temperature detector 6 that detects the temperature of the body of the occupant 3.

When the electric power of the vehicle is smaller than a predetermined value, the vehicle ECU 5 inputs the command signal of a power restriction mode into the system ECU 7. This power restriction command is a command to make the system ECU 7 perform the energy saving for the vehicle regardless of the intention of the occupant 3. When receiving the command of the power restriction mode, the system ECU 7 inputs the control signal into each heater ECU such that the heating output of a corresponding heater has a preset value. Each heater ECU controls the operation of a corresponding heater according to the control signal from the system ECU 7. The heating output controlled at the time of this power restriction is set at a similar value to the heating output in the power saving mode described above.

The system ECU 7 receives the command signal for the power restriction mode, and when the normal mode is set or when the priority mode is set, performs the heating operation with the output that is smaller than the heating output in each mode. In the power restriction mode, the setting may be at the heating output that is lower than the heating output in a state immediately before entering into the priority mode. In the power restriction mode, the setting may be at the heating output that is lower than the heating output set in the system ECU 7 as the heating output, which is necessary to give a satisfactory sense of heating to the occupant 3.

For example, an infrared sensor or an infrared thermography can be used for the temperature detector 6. Such a temperature detector 6 can detect the infrared radiation emitted from the occupant 3 without contact, to detect or visualize the surface temperature or heat distribution of each part of the occupant 3. The information on the surface temperature of the occupant 3 that is detected by the temperature detector 6 is inputted into the system ECU 7. The system ECU 7 analyzes this surface temperature information to detect a low-temperature region and a high-temperature region of the body of the occupant 3. Based on this detection result, the system ECU 7 can determine the priority mode that should be performed in the heating system 2 for the vehicle.

Figure 4:
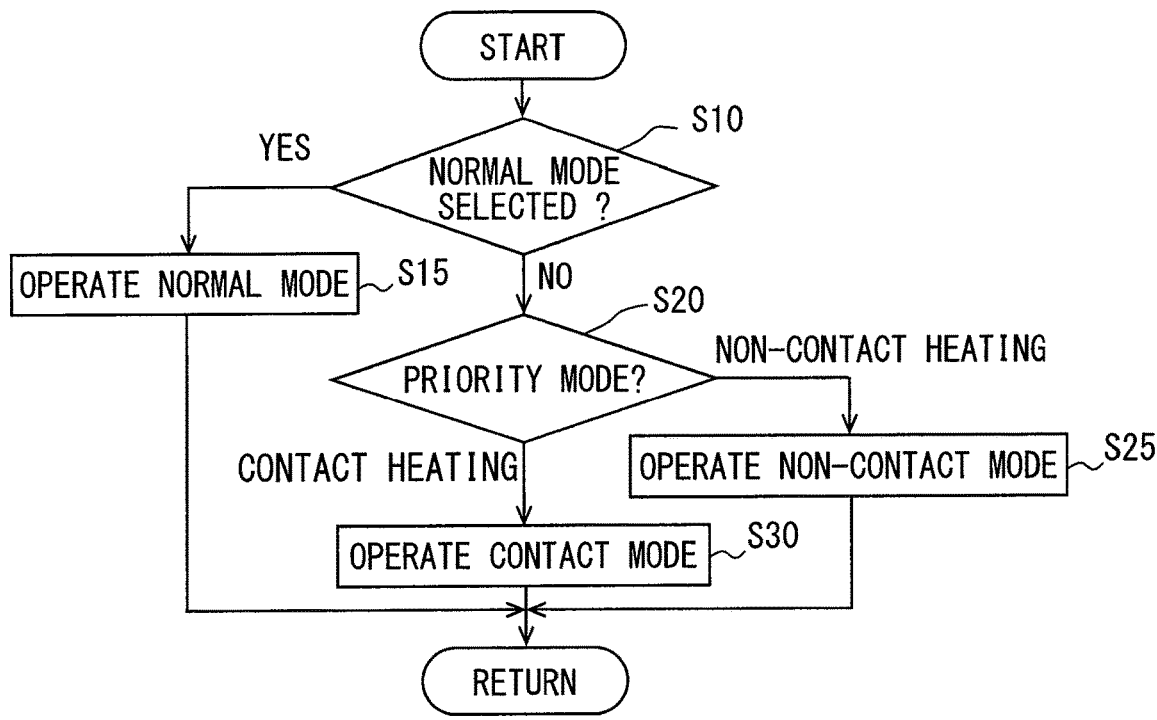
FIG. 4 is a flow chart illustrating heating control in accordance with a first embodiment.

The heating control of the first embodiment will be described with reference to the flow chart in FIG. 4. The system ECU 7 performs the control processing according to the flow chart in FIG. 4. This flow chart is started, for example, when the ignition switch or the start switch of the vehicle is turned on and when the operation command relating to the heating system 2 for the vehicle is inputted.

First at S10, the system ECU 7 determines whether the heating operation in the normal mode is set or not. When the normal mode switch 70 is operated through the operation by the occupant 3, the command to perform the heating operation in the normal mode is inputted into the system ECU 7 by the intention of the occupant 3. If the system ECU 7 determines at S10 that the normal mode is selected, the system ECU 7 transmits the control signal for performing the heating operation in the normal mode to each heater ECU. Then, each heater ECU applies the voltage value and the current value corresponding to the inputted control signal, and controls the operation of a corresponding heater (S15). The system ECU 7 returns to S10 again to continue the processing in this flow chart.

If determining that the normal mode is not selected at S10, then, at S20, the system ECU 7 determines what the priority mode chosen by the occupant 3 is. If the non-contact heating priority mode is chosen through the operation by the occupant 3 using the priority switch 71, the command to perform the non-contact heating priority mode is inputted into the system ECU 7 by the intention of the occupant 3. If the contact heating priority mode is chosen through the operation by the occupant 3, the command to perform the contact heating priority mode is inputted into the system ECU 7 by the intention of the occupant 3.

If determining at S20 that the non-contact heating priority mode is chosen, the system ECU 7 transmits the control signal for performing the heating operation in the non-contact heating priority mode to each heater ECU. Then, each heater ECU applies the voltage value and the current value corresponding to the inputted control signal, and controls the operation of a corresponding heater (S25). The heating operation in the non-contact heating priority mode based on the intention of the occupant 3 is immediately performed in this manner, and thus a sense of heating by radiation heat to the region of the body of the occupant 3 that is currently needed by the occupant 3 can be provided. The system ECU 7 returns to S10 again to continue the processing in this flow chart.

If determining at S20 that the contact heating priority mode is chosen, the system ECU 7 transmits the control signal for performing the heating operation in the contact heating priority mode to each heater ECU. Then, each heater ECU applies the voltage value and the current value corresponding to the inputted control signal, and controls the operation of a corresponding heater (S30). The heating operation in the contact heating priority mode based on the intention of the occupant 3 is immediately performed in this manner, and thus a sense of heating in the region of the body of the occupant 3 that is currently needed by the occupant 3 can be provided. The system ECU 7 returns to S10 again to continue the processing in this flow chart.

The operation and effects of the heating system 2 for the vehicle of the first embodiment will be described below. The heating system 2 for the vehicle includes the heater for non-contact heating that emits radiation heat to give warmth to the occupant 3 in a state where the body of the occupant 3 is not in contact with the heater, the heater for contact heating that gives warmth to the occupant 3 in a state where the body of the occupant 3 is in contact with the heater, and the control device that controls the operation of both the heaters. This control device performs control to be switchable between the non-contact heating priority mode to make larger the heating output of the heater for non-contact heating, and the contact heating priority mode to make larger the heating output of the heater for contact heating.

According to this control, the control can be performed to be switchable between the mode for the occupant 3 to receive the heating preferentially from the heater for non-contact heating, and the mode for the occupant 3 to receive the heating preferentially from the heater for contact heating. The heating system 2 for the vehicle can operate one of the non-contact heating priority mode and the contact heating priority mode as described above, and thus the heating operation that is not limited to the operation in only one mode can be provided for the occupant 3. In the case of the operation in the non-contact heating priority mode, the output from the heater for contact heating corresponding to the contact heating priority mode is restricted, and thus the energy for heating can be limited. In the case of the operation in the contact heating priority mode, the output from the heater for non-contact heating corresponding to the non-contact heating priority mode is restricted, and thus the energy for heating can be limited.

Thus, in the case of the operation in the non-contact heating priority mode, the body region of the occupant 3 to which the radiation heat from the heater for non-contact heating is emitted can be warmed more greatly. In the case of the operation in the contact heating priority mode, the body region of the occupant 3 to which the warmth from the heater for contact heating is given can be warmed more greatly. Consequently, the heating system 2 for the vehicle can provide the heating operation whereby the occupant 3 can enjoy a sense of heating that is not stereotypical and which can achieve energy saving.

The heating system 2 for the vehicle includes the priority switch 71 that can choose the preferential mode from the non-contact heating priority mode and the contact heating priority mode by its operation. The system ECU 7 performs the control in the mode chosen in accordance with the operation of the priority switch 71. Since the user can choose a favorite heating mode by him/herself, the heating operation that quickly satisfies a sense of warmth over the entire body of the user can be realized.

Second Embodiment

Figure 5:
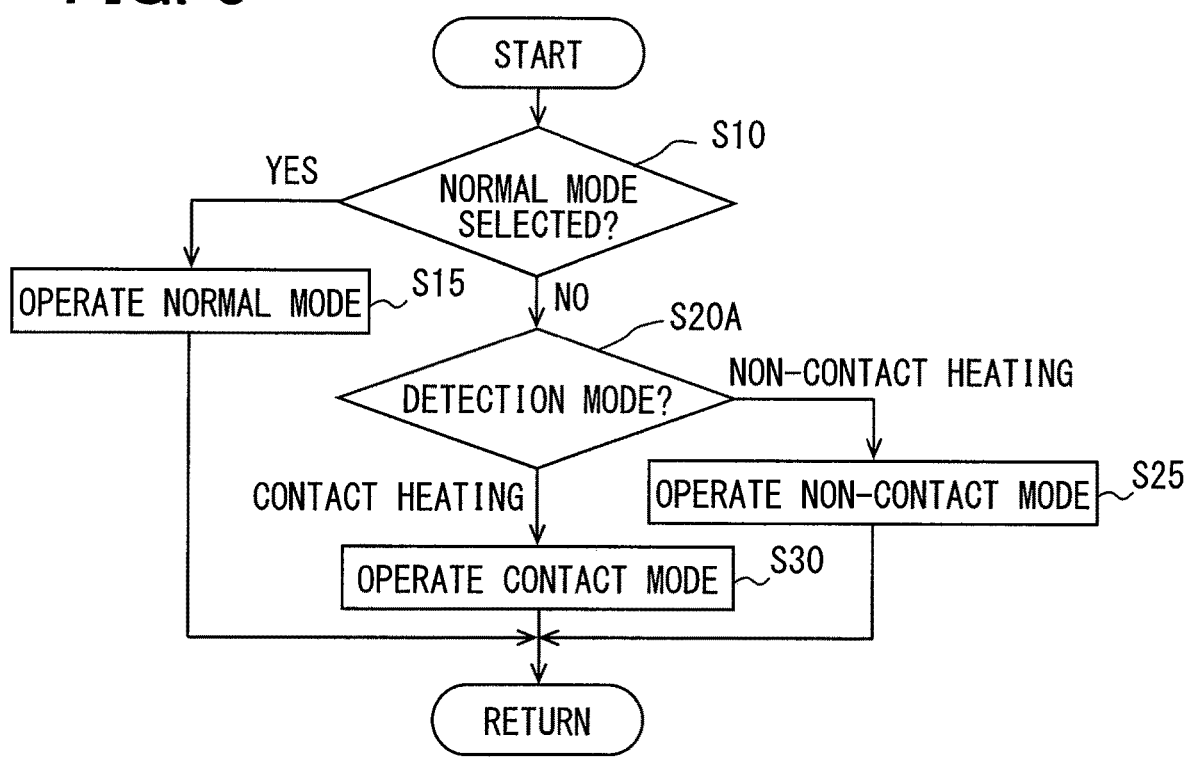
FIG. 5 is a flow chart illustrating heating control in accordance with a second embodiment.

In a second embodiment, the heating control, which is another mode in the first embodiment, will be described with reference to the flow chart in FIG. 5. In the second embodiment, the component part and step having the same reference numeral as in the drawing of the previously-described embodiment, and the configuration which is not particularly explained are similar to the previously-described embodiment, and have similar operation and effects. In the following description, the second embodiment will explain only a part that is different from the first embodiment. The device configurations except the flow chart in FIG. 5 applicable to the second embodiment are similar to the above first embodiment described with reference to FIGS. 1 to 3.

The procedure at S20A in the heating control of the second embodiment is different from the heating control of the first embodiment. The first embodiment chooses the priority mode through the operation of the priority switch 71 based on the intention of the occupant 3. The second embodiment is characterized in automatic determination of the priority mode based on the physical condition of the occupant 3 instead of through the operation by the occupant 3 on his/her own.

If determining at S10 that the normal mode is not selected, a system ECU 7 determines at S20A what the priority mode detected based on the surface temperature of the body of the occupant 3 is. As described above, this determination means that the system ECU 7 analyzes the surface temperature information detected by a temperature detector 6 to detect the low-temperature region and the high-temperature region of the body of the occupant 3, and determines the priority mode that can preferentially warm the low-temperature region. For example, if detecting that the foot part of the occupant 3 is lower in temperature than the trunk part or buttock part of the occupant 3, the system ECU 7 determines the non-contact heating priority mode as the priority mode. If detecting that the trunk part or buttock part of the occupant 3 is lower in temperature than the foot part of the occupant 3, the system ECU 7 determines the contact heating priority mode as the priority mode.

If determining at S20A that the priority mode is the non-contact heating priority mode, the system ECU 7, at S25, applies the voltage value or the like for performing the heating operation in the non-contact heating priority mode to each heater via a corresponding heater ECU to control automatic heating operation. The heating in the non-contact heating priority mode based on the physical condition of the occupant 3 is immediately performed in this manner, and the operation close to a sense of heating that is currently needed by the occupant 3 can thus be provided.

If determining at S20A that the priority mode is the contact heating priority mode, the system ECU 7, at S30, applies the voltage value or the like for performing the heating operation in the contact heating priority mode to each heater via a corresponding heater ECU to control automatic heating operation. The heating in the contact heating priority mode based on the physical condition of the occupant 3 is immediately performed in this manner, and the operation close to a sense of heating that is currently needed by the occupant 3 can thus be provided.

In the second embodiment, using the temperature detected by the temperature detector 6, the system ECU 7 performs the control in the mode to preferentially warm the lower-temperature region of the body of the occupant 3 from the non-contact heating priority mode and the contact heating priority mode. If the surface temperature of the body of the occupant 3 by the temperature detector 6 is lower at the foot part than at the trunk part, for example, this control warms the foot part of the occupant 3 by the non-contact heating priority mode, and thus can provide a sense of heating with high quick-heating performance. If the trunk part or palm has a lower temperature than the foot part, the back, buttock part or palm of the occupant 3 is warmed by the contact heating priority mode, and a sense of heating with high quick-heating performance can thus be provided. Therefore, the colder part of the body of the occupant 3 is preferentially warmed, and the automatic heating operation that can meet the need for heating by the occupant 3 can thus be provided.

Third Embodiment

Figure 6:
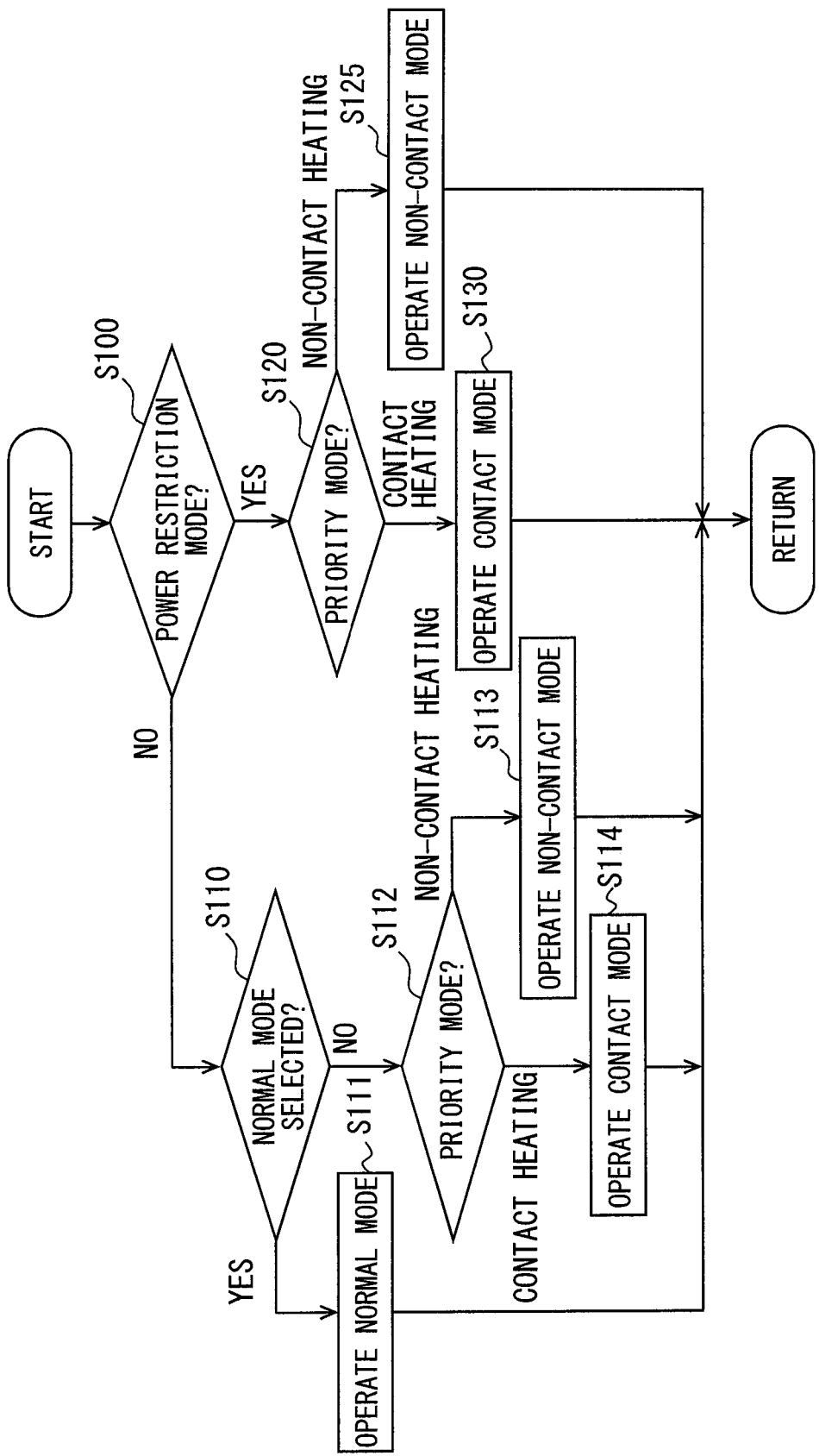
FIG. 6 is a flow chart illustrating heating control in accordance with a third embodiment.

In a third embodiment, the heating control, which is another mode in the first embodiment, will be described with reference to the flow chart in FIG. 6 In the third embodiment, the component part and step having the same reference numeral as in the drawing of the previously-described embodiments, and the configuration which is not particularly explained are similar to the previously-described embodiments, and have similar operation and effects. In the following description, the third embodiment will explain only a part that is different from the first embodiment. The device configurations except the flow chart in FIG. 6 applicable to the third embodiment are similar to the above first embodiment described with reference to FIGS. 1 to 3.

The heating control of the third embodiment is different from the heating control of the first embodiment in that, in accordance with whether the power restriction mode to restrict the power use in the vehicle is set or not, the processing that can be performed thereafter differs. When the flow chart in FIG. 6 is started, a system ECU 7 first determines at S100 whether the power restriction mode is set or not. A power restriction command is inputted into the system ECU 7 from, for example, a vehicle ECU 5, and the command to perform the power restriction mode is accordingly inputted into the system ECU 7. The power restriction mode is a mode in which a restriction is placed on the electric power that can be used for the heating operation to curb the consumption of the electric power stored in the vehicle, thus achieving the power saving.

If determining at S100 that the power restriction mode is set, the system ECU 7 determines at S120 what the priority mode based on the operation by the occupant 3 is. If determining at S120 that the non-contact heating priority mode is set, the system ECU 7 performs the heating operation in a non-contact heating mode at S125. If determining at S120 that the contact heating priority mode is set, the system ECU 7 performs the heating operation in a contact heating mode at S130. After both the steps S125, S130, the system ECU 7 returns to S100 to continue the processing in this flow chart.

At the steps S120, S125, S130, the processing similar to the respective steps S20, S25, S30 described above in the first embodiment is performed.

If determining at S100 that the power restriction mode is not set, then, the system ECU 7 determines at S110 whether the heating operation in the normal mode is set or not. If determining at S110 that the heating operation in the normal mode is set, the system ECU 7 performs the heating operation in the normal mode at S111. If determining at S110 that the heating operation in the normal mode is not set, the system ECU 7 determines at S112 what the priority mode based on the operation by the occupant 3 is. If determining at S112 that the non-contact heating priority mode is set, the system ECU 7 performs the heating operation in the non-contact heating mode at S113. If determining at S112 that the contact heating priority mode is set, the system ECU 7 performs the heating operation in the contact heating mode at S114. After any of the steps S111, S113, S114, the system ECU 7 returns to S100 to continue the processing in this flow chart.

At the steps S110, S111, S112, S113, S114, the processing similar to the respective steps S10, S15, S20, S25, S30 described above in the first embodiment is performed.

In the third embodiment, if the power restriction command from another device disposed in the vehicle is inputted into the system ECU 7, the system ECU 7 performs the operation in one of the non-contact heating priority mode and the contact heating priority mode in accordance with the mode chosen by the operation of a priority switch 71. When the power use in the vehicle needs to be restricted, this processing at S100, S120, S123, S130 performs the heating operation according to the priority mode based on the intention of the occupant 3. Thus, the heating operation that is adapted to the electric power situation of the vehicle and that satisfies a sense of heating of the occupant 3 can be provided.

The procedure at S120 may be replaced with the determination processing at S20A described in the second embodiment. Consequently, if the power restriction command from another device disposed in the vehicle is inputted into the system ECU 7, the system ECU 7 performs the operation in one of the non-contact heating priority mode and the contact heating priority mode in accordance with the mode to preferentially warm the lower-temperature region of the body of the occupant 3. When the power use in the vehicle needs to be restricted, this control performs the heating operation according to the priority mode based on the temperature state of the body of the occupant 3. Therefore, the heating operation that is adapted to the electric power situation of the vehicle and that is close to a sense of heating desired by the occupant 3 can be provided.

Fourth Embodiment

In a fourth embodiment, the heating control, which is another mode in the third embodiment, will be described with reference to the flow chart in FIG. 7. In the fourth embodiment, the component part and step having the same reference numeral as in the drawing of the previously-described embodiments, and the configuration which is not particularly explained are similar to the previously-described embodiments, and have similar operation and effects. In the following description, the fourth embodiment will explain only a part that is different from the third embodiment. The device configurations except the flow chart in FIG. 7 applicable to the fourth embodiment are similar to the above first embodiment described with reference to FIGS. 1 to 3.

The procedure at S100A in the heating control of the fourth embodiment is different from the heating control of the third embodiment. The fourth embodiment is characterized in that the power saving mode is selected by the intention of the occupant 3 to restrict the electric power.

Figure 7:
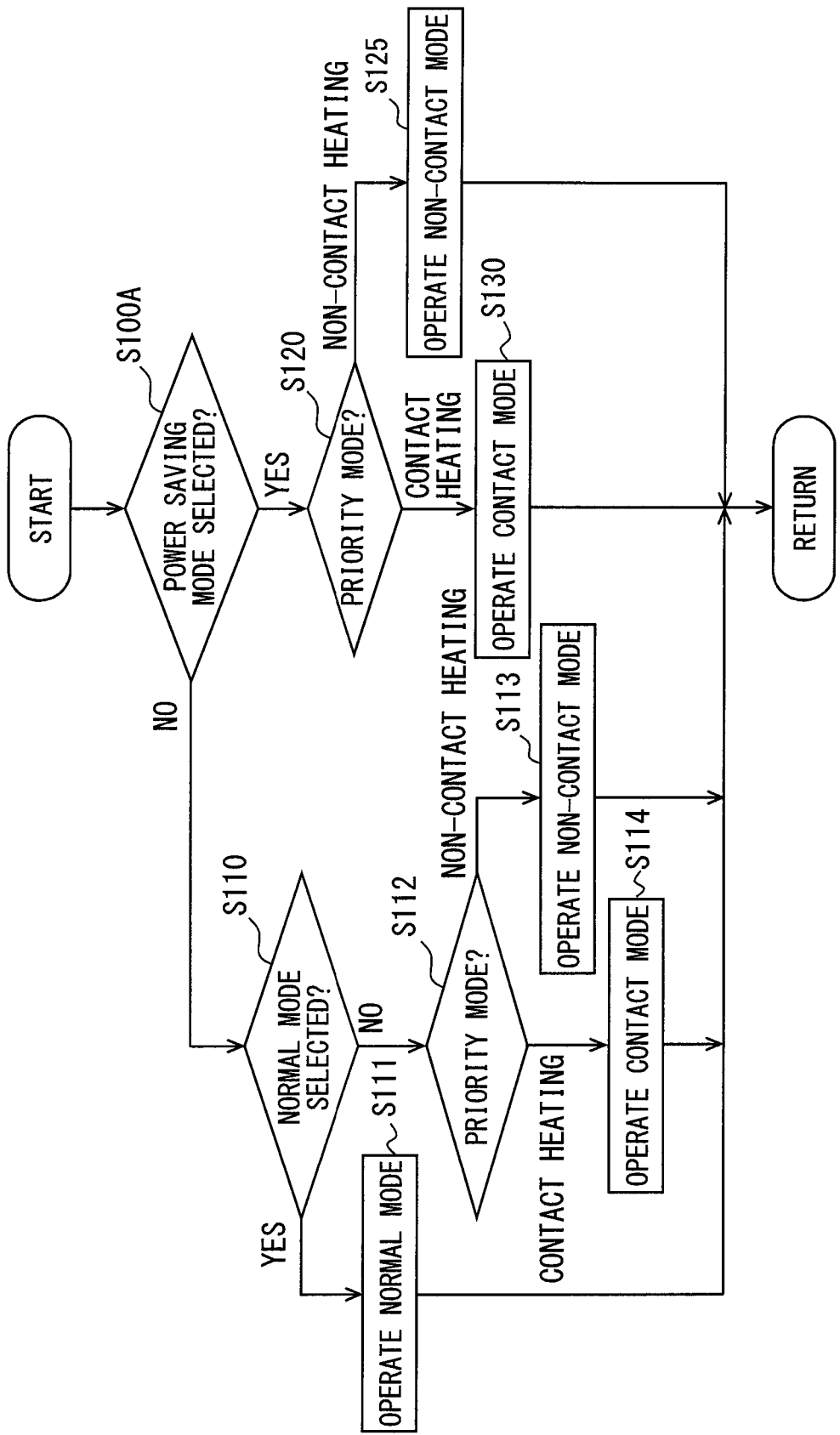
FIG. 7 is a flow chart illustrating heating control in accordance with a fourth embodiment.

When the flow chart in FIG. 7 is started, a system ECU 7 first determines at S100A whether the power saving mode is set or not. When a power saving switch 72 is operated through the operation by the occupant 3, the command to perform the power saving mode is inputted into the system ECU 7 by the intention of the occupant 3. If determining at S100A that the power saving mode is selected, then, the system ECU 7 determines at S120 what the priority mode based on the operation by the occupant 3 is. In this manner, if the power saving mode is selected, the system ECU 7 performs the heating operation by either priority mode through the determination processing at S120. Thus, the heating operation in the priority mode can be performed in response to the setting of the power saving mode by the occupant 3 thereby to achieve the energy saving.

If determining at S100A that the power saving mode is not set, then, the system ECU 7 determines at S110 whether the heating operation in the normal mode is set or not. In this manner, if the power saving mode is not selected, the system ECU 7 performs the heating operation in the normal mode or the heating operation by either priority mode through the determination processing at S110.

If the power saving command is inputted into the system ECU 7 by the occupant 3, the system ECU 7 of the fourth embodiment performs the operation in one of the non-contact heating priority mode and the contact heating priority mode in accordance with the mode chosen by the operation of a priority switch 71. When the occupant 3 wants to restrict the power use in the vehicle, this processing at S100A, S120, S123, S130 performs the heating operation according to the priority mode based on the intention of the occupant 3. Thus, the heating operation that is adapted to the intention to save the electric power by the occupant 3 and that satisfies a sense of heating of the occupant 3 can be provided.

The procedure at S120 may be replaced with the determination processing at S20A described in the second embodiment. Consequently, if the power saving command is inputted into the system ECU 7 by the occupant 3, the system ECU 7 performs the operation in one of the non-contact heating priority mode and the contact heating priority mode in accordance with the mode to preferentially warm the lower-temperature region of the body of the occupant 3. When the occupant 3 wants to restrict the power use in the vehicle, this control performs the heating operation according to the priority mode based on the temperature state of the body of the occupant 3. Thus, the heating operation that is adapted to the intention to save the electric power by the occupant 3 and that is close to a sense of heating desired by the occupant 3 can be provided.

The embodiments have been described above. The present disclosure is not by any means limited to the above embodiments, and can be embodied in various modifications. The configurations in the above embodiments are thoroughly examples, and the technical scope of the present disclosure is not limited to the scope of these descriptions.

In the above embodiments, the system ECU 7 may be a control device that is configured integrally with at least one of the radiation heater ECU 100, the steering heater ECU 210, the seat heater ECU 200, the armrest heater ECU 220, and so forth. The system ECU 7 may be a common control device that is integral with the vehicle ECU 5.

In the above embodiments, each heater ECU may perform control to energize a corresponding heater by the pulse width modulation control (PWM control) that changes the ratio between a voltage applying time and a voltage non-applying time.

The heating system 2 for the vehicle in the above embodiments may be configured as the system that provides heating for the occupant 3 in synchronization with an air-conditioning system for a vehicle which air-conditions a vehicle interior.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A heating system for a vehicle, the heating system being disposed in the vehicle to give warmth to an occupant of the vehicle and comprising:
   a heater for non-contact heating that emits radiation heat by heat supplied from a heat generating part, which generates heat upon energization, to give warmth to the occupant by heating a first region of a body of the occupant that is not in contact with the heater for non-contact heating;
   a heater for contact heating that generates heat upon energization to give warmth to the occupant by heating a second region the body of the occupant that is in contact with the heater for contact heating;
   a control device that controls operations of the heater for contact heating and the heater for non-contact heating, wherein the control device adjusts a heating output provided by the heater for contact heating and a heating output provided by the heater for non-contact heating, and controls the operations to be switchable between:
      a non-contact heating priority mode to make larger the heating output of the heater for non-contact heating than the heating output of the heater for contact heating; and
      a contact heating priority mode to make larger the heating output of the heater for contact heating than the heating output of the heater for non-contact heating; and
   a temperature detector that detects a temperature of each part of the body of the occupant, wherein
      the control device is configured to
         detect a lower-temperature region and a higher-temperature region of the body of the occupant based on the temperature of each part of the body of the occupant detected by the temperature detector,
         determine whether the detected lower-temperature region corresponds to the first region or the second region of the body of the occupant,
         control the heater for non-contact heating and the heater for contact heating to operate in the non-contact heating priority mode in response to determining that the detected lower-temperature region corresponds to the first region of the body of the occupant, and
         control the heater for non-contact heating and the heater for contact heating to operate in the contact heating priority mode in response to determining that the detected lower-temperature region corresponds to the second region of the body of the occupant.

2. The heating system for the vehicle according to claim 1, wherein the temperature detector is an infrared sensor that detects infrared radiation emitted from the occupant and
   the control device
      analyzes by comparing the temperature detected from the each part of the body of the occupant, based on the infrared radiation emitted from the occupant, with each other to identify the lower-temperature region among the each part of the body of the occupant, and the higher-temperature region among the each part of the body of the occupant.

3. The heating system for the vehicle according to claim 1, wherein:
   the first region is a foot part of an occupant of the vehicle, and
   the second region is a trunk part or a buttock part of the occupant.

4. The heating system for the vehicle according to claim 1, wherein:
   the control device is configured, in the non-contact heating priority mode, to control to restrict the heating output of the heater for contact heating to be lower than the heating output in a state immediately before entering into the non-contact heating priority mode, and
   the control device is configured, in the contact heating priority mode, to control to restrict the heating output of the heater for non-contact heating to be lower than the heating output in a state immediately before entering into the contact heating priority mode.

5. The heating system for the vehicle according to claim 1, wherein:
   the control device is configured, in the non-contact heating priority mode, not to operate the heating output of the heater for contact heating, and the control device is configured, in the contact heating priority mode, not to operate the heating output of the heater for non-contact heating.

6. A heating system for a vehicle, comprising:

a heater for non-contact heating that emits radiation heat by heat supplied from a heat generating part, which generates heat upon energization, to give warmth to the occupant by heating a first region of a body of the occupant that is not in contact with the heater for non-contact heating;

a heater for contact heating that generates heat upon energization to give warmth to the occupant by heating a second region of the body of the occupant that is in contact with the heater for contact heating;

a control device that controls operations of the heater for contact heating and the heater for non-contact heating, wherein the control device adjusts a heating output provided by the heater for contact heating and a heating output provided by the heater for non-contact heating, and controls the operations to be switchable between:
  a non-contact heating priority mode to make the heating output of the heater for non-contact heating larger than the heating output of the heater for contact heating; and
  a contact heating priority mode to make the heating output of the heater for contact heating larger than the heating output of the heater for non-contact heating; and a temperature detector that detects a temperature of a plurality of regions on the body of the occupant, wherein the control device is configured to
  compare the temperature detected from the plurality of regions on the body of the occupant to identify a lower-temperature region among the plurality of regions on the body of the occupant, and a higher-temperature region among the plurality of regions on the body of the occupant,
  determine whether the identified lower-temperature region corresponds to the first region or the second region of the body of the occupant,
  control the heater for non-contact heating and the heater for contact heating to operate in the non-contact heating priority mode in response to determining that the detected lower-temperature region corresponds to the first region of the body of the occupant, and
  control the heater for non-contact heating and the heater for contact heating to operate in the contact heating priority mode in response to determining that the detected lower-temperature region corresponds to the second region of the body of the occupant.

7. The heating system for the vehicle according to claim 6, wherein the first region is a foot part of an occupant of the vehicle and the second region is a trunk part or a buttock part of the occupant.

8. The heating system for the vehicle according to claim 6, wherein the control device is configured to:
  reduce the heating output of the heater for contact heating in the non-contact heating priority mode; and
  reduce the heating output of the heater for non-contact heating in the contact heating priority mode.

9. The heating system for the vehicle according to claim 6, wherein the control device is configured not to operate the heater for contact heating in the non-contact heating priority mode and not to operate the heater for non-contact heating in the contact heating priority mode.

* * * * *